June 30, 1931. R. A. GOEPFRICH 1,812,000

BRAKE

Filed March 11, 1929

INVENTOR.
RUDOLPH A. GOEPFRICH
BY
ATTORNEY

Patented June 30, 1931

1,812,000

UNITED STATES PATENT OFFICE

RUDOLPH A. GOEPFRICH, OF SOUTH BEND, INDIANA, ASSIGNOR TO BENDIX BRAKE COMPANY, OF SOUTH BEND, INDIANA, A CORPORATION OF ILLINOIS

BRAKE

Application filed March 11, 1929. Serial No. 345,947.

This invention relates to brakes, and is illustrated as embodied in an internal expanding automobile brake. An object of the invention is to provide simple and effective means for applying a flexible friction band or its equivalent, by crowding against it a series of rollers or other disconnected thrust elements. Various features of novelty relate to the arrangement of these thrust elements, to the structure and arrangement of the friction means, to the applying means, and to various novel and desirable details which will be apparent from the following description of the illustrative embodiment shown in the accompanying drawings, in which:

Figure 1:
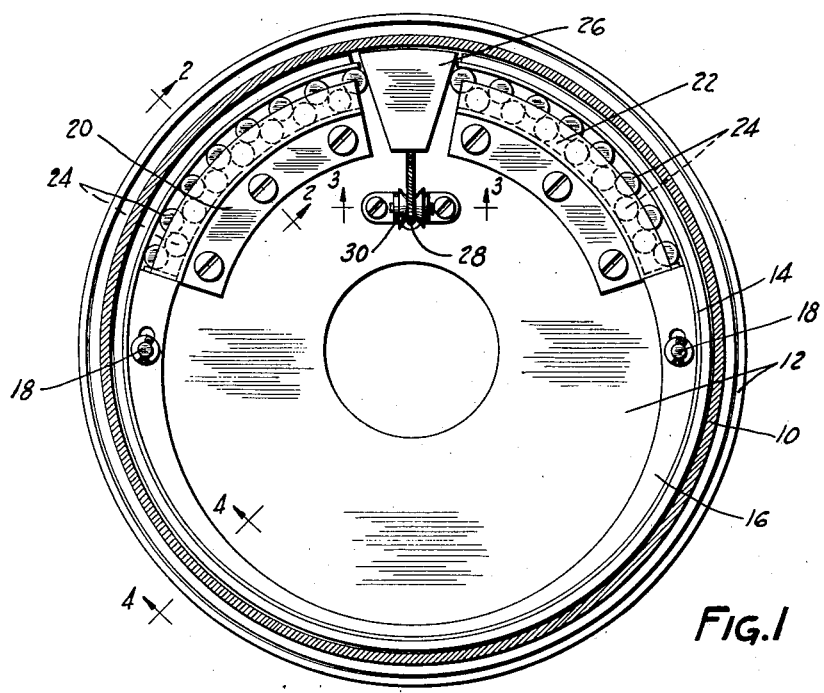
Figure 1 is a vertical section through the brake, just inside the head of the brake drum, and showing the brake friction means in side elevation.
Figure 2:
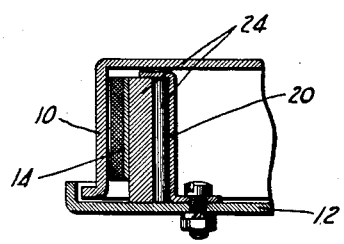
Figure 2 is a partial section on the line 2—2 of Figure 1, showing one of the thrust elements.
Figure 4:
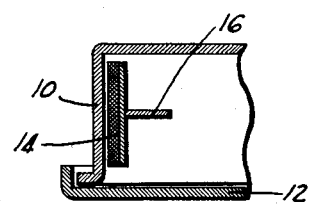
Figure 4 is a partial section on the line 4—4 of Figure 1, showing the shoe structure.
Figure 3:
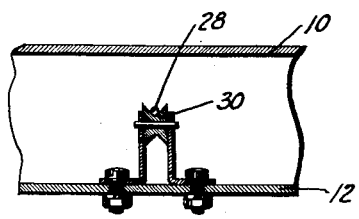
Figure 3 is a partial section on the line 3—3 of Figure 1, showing part of the applying means.

The illustrated brake includes a rotatable drum 10, at the open side of which is a support such as a backing plate 12, and within which is arranged the friction means of the brake. The friction means preferably includes a flexible steel band 14, faced with suitable friction lining, and which is shown unreinforced for some 45° to 60° at each end. The remainder of the band is reinforced by a suitable web, shown as a steel stamping 16 welded to the inner face of the band. Most of web 16 is so low in height that the band even where reinforced is still substantially flexible, although less flexible and therefore more controllable than at the ends. Suitable steady rests 18 may engage web 16.

The torque of band 14 is taken by engagement of one or the other of the ends of web 16 with one or the other of two stamped steel housings 20 or 22 underlying the unreinforced ends of the band and bolted or otherwise secured to the backing plate. When the drum is turning counter-clockwise the band anchors on housing 22, and when the drum is turning clockwise the band anchors on housing 20. While suitable return springs may be provided if desired, I prefer to make band 14 and web 16 of spring material tending to withdraw from the drum into released positions determined by engagement with housings 20 and 22.

Housings 20 and 22 contain staggered series of disconnected thrust elements such as rollers 24, crowded together in applying the brake to expand outwardly and force the ends of the band 14 against the drum so that one end or the other will tend to turn with the drum and apply the brake by a self-energizing action. The rollers are shown operated by means such as a wedge 26 drawn radially inward to apply the brake by a flexible cable 28 passing over a pulley 30 carried by the backing plate and thence outwardly through an opening in the backing plate at right angles thereto.

While one illustrative embodiment has been described in detail, it is not my intention to limit its scope to that particular embodiment or otherwise than by the terms of the appended claims.

I claim:

1. A brake comprising, in combination, a drum, a friction device engageable with the drum and backed by a plurality of disconnectedly-engaging thrust elements, and means for crowding the thrust elements together to cause them to react on each other to force the friction device outwardly against the drum.

2. A brake comprising, in combination, a drum, a friction device engageable with the drum having separable ends and backed at least adjacent said ends by a plurality of disconnectedly-engaging thrust elements, and means adjacent said ends for crowding the thrust elements together to cause them to react on each other to force the friction device outwardly against the drum.

3. A brake comprising, in combination, a drum, a friction device engageable with the drum and backed by a plurality of disconnectedly-engaging thrust elements, and means for crowding the thrust elements together to cause them to react on each other to force the friction device outwardly against the drum, together with housing means for said elements arranged to take the braking torque of said friction device.

4. A brake comprising, in combination, a drum, a friction device engageable with the drum having separable ends and backed at least adjacent said ends by a plurality of disconnectedly-engaging thrust elements, and means adjacent said ends for crowding the thrust elements together to cause them to react on each other to force the friction device outwardly against the drum, together with housing means for said elements arranged to take the braking torque of said friction device.

5. A brake comprising, in combination, a drum, a friction device within said drum having spaced anchoring parts, housing means engaged by one of said parts when the drum is turning in one direction and by the other of said parts when the drum is turning in the other direction, and brake-applying means arranged in said housing means.

6. A brake comprising, in combination, a drum, a friction device within said drum having spaced anchoring parts, housing means engaged by one of said parts when the drum is turning in one direction and by the other of said parts when the drum is turning in the other direction, and brake-applying means arranged in said housing means, disconnectedly-engaging thrust elements in the said housing means, and means for crowding the thrust elements together to force the friction device outwardly against the drum.

7. A brake comprising, in combination, friction means, a series of rollers backing the friction means, and means for crowding the rollers together to force the friction means in a brake-applying direction.

8. A brake comprising, in combination, a drum, a pair of housings, a friction device anchoring on one housing when the drum is turning in one direction and on the other housing when the drum is turning in the other direction, parts in said housings for forcing the friction device against the drum, and applying means between the housings for actuating said parts.

9. A brake comprising, in combination, a drum, a pair of housings, a friction device adjacent said housings, parts in said housings for forcing the friction device against the drum, and applying means between the housings for actuating said parts.

10. A brake comprising, in combination, a drum, a pair of housings containing disconnected thrust elements, a friction device anchoring on one of said housings when the drum is turning in one direction and on the other housing when the drum is turning in the other direction, and means between said housings for crowding the elements in opposite directions to force the friction device against the drum.

11. A brake comprising, in combination, a drum, a pair of housings containing disconnected thrust elements, a friction device adjacent said housings, and means between said housings for crowding the elements in opposite directions to force the friction device against the drum.

12. A brake comprising, in combination, a drum, an applying device, short housings on opposite sides of the applying device, a friction device extending nearly the entire drum circumference and anchoring on one of said housings when the drum is turning in one direction and on the other of said housings when the drum is turning in the other direction, and thrust elements in said housings crowded together by the applying device to force the friction device against the drum.

13. A brake comprising, in combination, a drum, an applying device, housings on opposite sides of the applying device, a friction device, and thrust elements in said housings crowded together by the applying device to force the friction device against the drum.

14. A brake comprising, in combination, a drum, an applying device, friction means having one part which anchors when the drum is turning in one direction and another part which anchors when the drum is turning in the other direction, and disconnected thrust elements crowded on each other by the applying device to force the friction means against the drum.

15. A brake comprising, in combination, a drum, an applying device, friction means, and disconnected thrust elements crowded on each other by the applying device to force the friction means against the drum.

16. A flexible friction band having a partially-flexible reinforcement for its center terminating in abrupt shoulders adapted to engage anchoring means.

In testimony whereof, I have hereunto signed my name.

RUDOLPH A. GOEPFRICH.